Oct. 10, 1933.    G. N. HUTCHINSON    1,930,273
GAUGE
Filed Feb. 28, 1931    2 Sheets-Sheet 1

INVENTOR
Glen N. Hutchinson
BY his ATTORNEY

Oct. 10, 1933.    G. N. HUTCHINSON    1,930,273
GAUGE
Filed Feb. 28, 1931    2 Sheets-Sheet 2
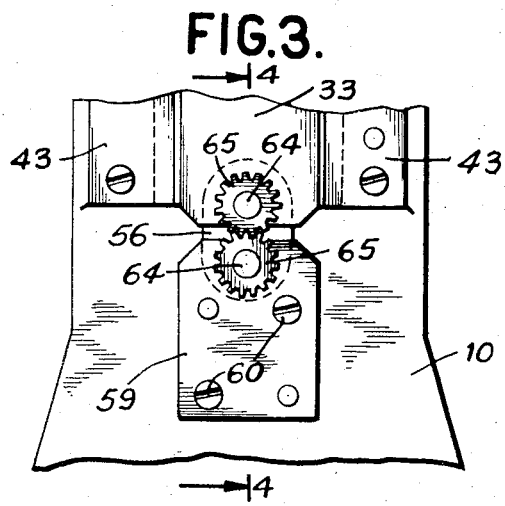
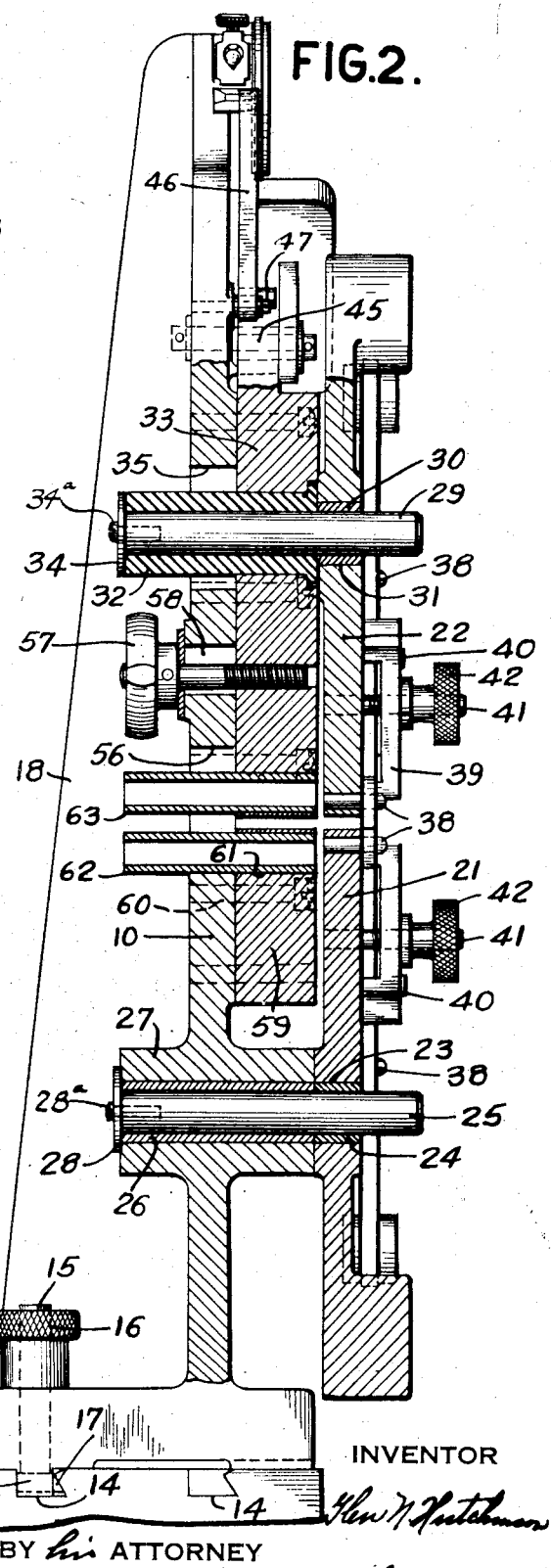
INVENTOR
BY his ATTORNEY Patented Oct. 10, 1933

1,930,273

UNITED STATES PATENT OFFICE 1,930,273

GAUGE

Glen N. Hutchinson, Endicott, N. Y., assignor, by mesne assignments, to International Business Machines Corporation, New York, N. Y., a corporation of New York Application February 28, 1931. Serial No. 518,982

2 Claims. (Cl. 73—51)

The present invention relates to gauges in general and particularly to gauges used to determine if the teeth of gears, pinions, or racks have been accurately cut.

The primary object of the present invention is to provide a novel and improved device for checking the accuracy with which gear teeth have been cut in machine parts such as gears, pinions, and racks of either the straight or curved type.

Another object is to provide a device which is adapted to be used in connection with any wellknown optical device which compares the shape of the machined part produced with a suitable chart having a large scale outline of the machined part to be inspected. Such optical devices, of which the Hartness comparator is a specific example, usually have a light source, a lens system, and a screen arranged so that a greatly enlarged outline of the portions of the machined part to be measured or inspected is projected upon the screen, the outline of the machined part being superimposed upon a large scale outline accurately constructed on the screen and having the exact proportions which the machined part should have in order to be acceptable. The degree of magnification is usually very high ranging from 50:1 in the case of large size parts to 200:1 in the case of small parts.

A more specific object is to provide means for determining if a gear, pinion, or circular rack has been cut with the correct pitch diameter.

Another object is to provide a gauge which is simple in construction, accurate and reliable in its operation, and gives the desired results quickly and efficiently.

Various other objects, advantages, and features of the present invention will be pointed out in the following specification and claims or will be apparent from a study thereof and of the accompanying drawings.

In the drawings:

Fig. 2 is a vertical section taken on the line 2—2 in Fig. 1.

Fig. 3 is a front view showing the manner in which pinions or gears may be mounted upon the gauge.

Fig. 4 is a vertical section taken on the line 4—4 in Fig. 3.

Figure 1:
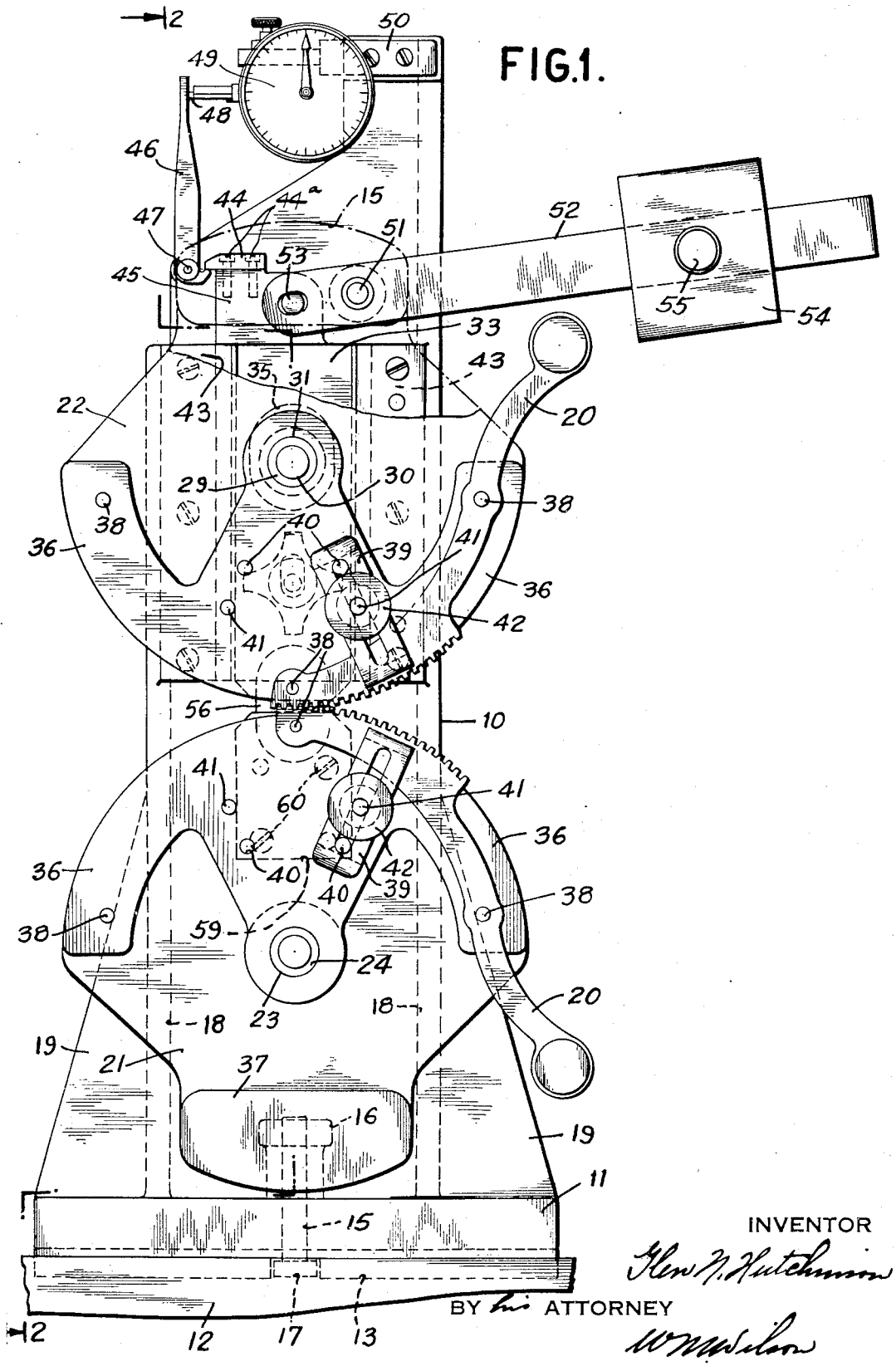
Fig. 1 is a front elevation of a gauge embodying the present invention, a part having been broken away to more clearly illustrate the construction and arrangement, and shows the manner of mounting circular racks on the gauge.

The gauge illustrated in the drawings has been designed for the specific purpose of inspecting small machined racks and pinions used in weighing scales, however, it is not limited to such a purpose as by suitable changes in the proportions of the various parts of the gauge, it may be used for inspecting other machined parts having gear teeth cut thereon. The racks for such scales take the form of irregularly shaped metal parts which have a circularly disposed series of gear teeth cut therein. Two of these racks are illustrated in Fig. 1 and it will be obvious that it is a difficult problem to accurately gauge such racks in order to determine if the gear teeth have been accurately cut and properly located in the body of the rack owing to the irregular shape. The problem has been solved, according to the present invention, by providing a gauge in which the racks are mounted in a manner whereby the behavior of the racks may be readily observed while they are being moved in meshing relation, a suitable indicating device being also provided for determining variations in the pitch diameter of the rack or pinion.

The main frame of the gauge comprises a unitary structure or framework 10, preferably taking the form of a single metal casting having a base 11 adapted to rest upon the surface of the table 12 of the optical device. The table 12 is adjustable both vertically and longitudinally upon a suitable base (not shown) which also supports the various parts of the optical device such as the light source and lens system (also not shown).

The base 11 is provided with a transverse rib 13 (Figs. 1 and 2) which is adapted to cooperate with one of several grooves 14 which are provided in the top surface of the table of the optical device for the very purpose here shown, namely, to mount suitable fixtures or gauges for holding the part or parts to be examined or measured with the optical device. The rib 13, in the present case, prevents the frame 10 from being turned about its vertical axis and relative to the table 12. The means for securely fastening the gauge to the table 12 comprises a clamping screw 15 which passes through a vertical hole in the center of the base 11 and has a knurled thumb nut 16 by means of which the screw 15 may be drawn upwardly to clamp the gauge to the table 12. The head 17 of the screw 15 is formed with a flat side (Fig. 2) adapted to fit snugly against the left wall of the slot 14 which is vertical and is also provided with an inclined portion diametrically opposite the flat side and adapted to fit snugly against the right wall of groove 14 which is inclined. It is obvious that, when the screw 15 is drawn upwardly by tightening the thumb nut 16, the inclined wall of groove 14 will wedge the correspondingly inclined head of screw 15 to the left (Fig. 2) and force the flat side of the head against the vertical wall of the slot 14 thereby firmly holding the head of the screw and permitting the gauge to be fastened securely to the table 12. This construction readily permits the head of the screw 15 to be inserted in the slot 14 without the necessity of sliding the screw lengthwise of the slot until the head becomes disengaged therefrom as would be the case if the usual T-bolt and T-slot were used.

The front face of the frame 10 is substantially flat while the rear face has a pair of spaced ribs 18 extending upwardly and tapering from the base 11 to the top of the frame, the said ribs serving to firmly brace the front face of said frame 10 so as to prevent possible breakage of the casting and permitting a lighter casting to be used. The front face of frame 10 broadens out near the base 11 to form transverse vertical ribs 19 which further serve to brace the frame.

The means for rotatably mounting the circular racks 20 comprises two members 21, 22, the lower member 21 being pivotally mounted upon a fixed axis while the upper member 22 is pivotally mounted upon a vertically movable slide. The lower member 21 is preferably made of a single metal casting and has a central hole 23 within which tightly fits a bushing 24, the hole of which is accurately ground. A pin 25 fits tightly in the hole in bushing 24 and is journalled in a bushing 26 pressed tightly into a hole in a hub 27 formed in the frame 10 midway between the ribs 18, the pin 25 and the hole in bushing 26 being accurately ground so that no lost motion is permitted between said pin and said bushing 26. The pin 25 extends somewhat to the right (Fig. 2) for a purpose to be explained later herein. In order to prevent the pin 25 from working out of the bushing 26 or being accidentally withdrawn therefrom, there is provided a washer 28 which is held by a screw 28a against the end of the pin and abuts the left end of the hub 27. It will be clear from the foregoing that the member 21 may be rotated freely about the axis of pin 25, without any lost motion owing to the accuracy of the fit between the relatively movable parts.

The upper member 22 is similarly pivotally supported by a pin 29 fitting snugly in a bushing 30, similar to the bushing 24 and pressed tightly into a hole 31 in member 22. The pin 29 is freely rotatable in a bushing 32 pressed tightly into a slide 33 and is provided with a washer 34 and screw 34a similar to the washer 28 and screw 28a, respectively, for the purpose of preventing withdrawal of the pin 29 from the bushing 32. The pin 29, like the pin 25, extends to the right for a purpose to be explained more fully hereinafter. In order to prevent any tendency of the pin 29 to bend or wabble in the bushing 32, the latter is purposely made with rather thick walls and is considerably longer than the thickness of the slide 33 and extends through a slot 35 formed in the frame 10. The axes of pins 25, 29 should be strictly parallel for best results in order to prevent errors in the use of the gauge which might result if the axes of said pins were inclined to each other, since it is necessary that the racks 20 mounted on members 21, 22 mesh squarely with each other so that opposing faces of the teeth will be parallel at the line of rolling contact when the teeth have been correctly machined.

The members 21, 22 are alike in all respects and are both provided with arcuate flat surfaces or bosses 36 against which the racks 20 are clamped. Since the members 21, 22 are quite irregular in shape both are provided with counter weights 37 which are of sufficient magnitude to counterbalance the members 21, 22, the racks 20, and the clamps holding the racks in place on the members. Each rack 20 has two holes with which cooperate pins 38 by means of which the racks are accurately located upon the surfaces 36 with respect to the centers of pins 25, 29 so that the centers of the pitch circles of the teeth in said racks will be concentric with the centers of pins 25, 29, provided the teeth have been accurately cut and correctly located. It should be noted that there are three pins 38 on each member 21, 22 so disposed that the racks can be inspected as they are arranged in Fig. 1 and then reversed and inspected after being placed on the left sides of the members 21, 22. The racks are held in place by means of slotted clamps 39 guided by pins 40, 41 extending through the slots in the clamps. The pins 41 are in reality studs threaded at both ends, one end of each stud being screwed tightly into a threaded hole in the associated member 21, 22 and provided at its other end with a thumb nut 42 by means of which the clamp 39 may be forced tightly against the rack thereby holding the latter firmly in place. It is obvious that the racks may be readily removed and replaced by simply loosening the thumb nuts and sliding back the clamp 39.

The slide 33 is constrained to a vertical path of movement by a pair of fixed guides 43 and is adapted to control an indicating device by means of an element 44 integrally mounted by means of screws 44a upon an extension 45 of said slide. The left end (Fig. 1) of the element 44 bears upon a rounded and polished nose formed in an upwardly extending member 46 pivoted at 47 to the frame 10. The free end of the member 46 bears against the end of the operating element 48 of a measuring gauge 49 of the dial type which is adjustably mounted upon a bracket 50 attached to the extreme upper end of the frame 10.

The dial of the gauge 49 may be graduated in thousandths of an inch if desired. The member 46 is in effect a multiplier which causes the pointer of the gauge 50 to move a considerable distance when the slide 33 moves a small amount. The ratio between the distance of the nose in member 46 from the center of the pivot 47 and the distance of the end of the operating element 48 from the center of pivot 47 is about one to ten, consequently it is clear that a movement of the slide 33 a distance of one thousandth of an inch will cause the pointer of the gauge 49 to move ten thousandths. This means that each graduation of gauge 49 will represent one ten-thousandth of an inch.

The racks 20 should mesh with normal pressure during the inspecting operation, therefore, since the member 22, slide 33, and parts carried thereby have a total weight of a value considerably in excess of the normal contact pressure of a rack and its pinion, means must be provided to secure the proper pressure between the two racks being inspected. Pivoted at 51 to the frame 10 is a counterbalancing beam 52 having a pin and slot connection at 53 to the slide 33 and a slidable counterbalancing weight 54 which may be adjusted lengthwise of the beam 52 until only sufficient weight remains unbalanced to cause normal pressure between the teeth of the racks at the line of rolling contact, a thumb screw 55 permitting locking of the weight 54 in its adjusted position.

The frame 10 is provided with a large opening 56 behind the point of contact of the racks 20 with each other, the purpose of which is to allow the projection of a beam of light between the teeth of the racks so that a greatly enlarged outline or silhouette of the meshed racks will be superimposed upon a large scale chart accurately constructed upon a screen thereby permitting a careful study to be made of the behavior of the racks at the meshing point and comparison with the chart. As it is desirable at times to be able to lock the slide 33 against movement there is provided a thumb screw 57 which extends through a slot 58 in the frame 10 and is threaded into a hole in slide 33 by means of which the slide may be locked in any position within the limits determined by the length of the slot 58.

The foregoing description has been concerned largely with an explanation of the manner in which circular racks are mounted in the gauge. In Figs. 3 and 4 there is shown in detail an arrangement whereby simple gears or gear pinions may be mounted on the gauge for inspection purposes. Rigidly mounted upon the front face of the frame 10 adjacent the opening 56 is a block 59 held in place by screws 60 and suitable dowel pins. The block 59 has a hole 61 into which is pressed a bushing 62 approximately twice as long as the thickness of the block 59. The slide 33, adjacent the opening 56, has a similar bushing 63 accurately located so that the axes of both bushings 62, 63 are parallel to each other and perpendicular to the front face of the frame 10. The holes in bushings 62, 63 are of a size to rotatably support pins 64 which are alike in all respects and are adapted to be pressed into the holes in the hubs of the gears or pinions 65 to be inspected. The bushings 62, 63 and pins 64 are preferably made of hardened steel in order to reduce to a minimum wear due to constant use and also to insure accuracy of fit. The pins 64 are retained in the bushings with a degree of fit just sufficient to permit the pins to be turned freely without lost motion transverse of the axis of the pins. It will be understood that the parts carried by the pins 25, 29 will be removed from the gauge during the times when simple pinions or gears are being inspected. This operation may be readily accomplished by removing the screws holding the washers 28, 34 in place thereby permitting withdrawal of the pins 25, 29 and the parts carried thereby.

The detailed construction of the gauge having been described its use in inspecting pinions and racks will now be explained. The operator of the machine for cutting the pinions and racks, before proceeding with the cutting of a batch of racks will, of course, set up his machine with the necessary fixtures for holding the pinions or racks in place during the cutting operation. He will next cut several racks making sure that they are slightly oversize and will clamp two of them in place upon members 21, 22 in the manner shown in Fig. 1 so that the teeth on corresponding ends of each rack may be brought into mesh with one another.

The light source will be adjusted so as to project a beam of light between the teeth while in meshing relation and through the opening 56 provided for that purpose and by suitable adjustments of the optical system a sharply defined and greatly enlarged silhouette or shadow of the teeth in meshing relation will be superimposed upon a large scale outline or chart accurately constructed upon the screen of the optical device.

The next operation is to loosen the thumb screw 57 just enough to allow the beam 52 to be tapped lightly with the hand in a manner to bring the racks gradually into mesh until it is observed on the screen that the teeth of the racks mesh correctly, it being assumed that when the racks are first placed upon the members 21, 22 and clamped in place that they mesh rather loosely. When it is observed that the teeth of the racks mesh correctly the thumb screw 57 will be tightened to prevent further movement of the slide 33 and then the distance between the pins 25, 29 will be accurately measured by means of a micrometer or suitable gauge blocks. It is for this purpose that the pins 25, 29 are extended outwardly somewhat from the surface of the members 21, 22. The diameter of the pins 25, 29 being accurately measurable, the distance between centers of said pins may be very accurately determined, and represents the pitch diameter when the teeth have been correctly cut and are meshing properly, therefore it is an easy matter to determine when the teeth of the racks have been cut with the correct pitch diameter.

It will be recalled that the operator first cuts the teeth of the racks slightly oversize, therefore, it is obvious that, by taking the measurement just described he may readily determine exactly how much the teeth have been cut oversize as regards the pitch diameter and may make suitable adjustments in the machine to secure the correct pitch diameter, and by repeating the foregoing measuring operation several times with successively cut racks there will eventually be secured by a cut-and-try process a pair of racks which have the correct pitch diameter.

By performing the foregoing operation of determining the correct pitch diameter with several different sections of the racks in correct meshing relation, it will be found to be an easy matter to determine when the teeth have been accurately centered upon the rack. This result may be obtained very readily by loosening the thumb screw 57, raising the slide 33 slightly, turning the members 21, 22 in meshing relation until a different group of teeth has been brought into mesh, and then lowering the slide 33 until an inspection of the shadow thrown upon the screen shows that the teeth are in correct meshing relation, and finally measuring the pitch diameter as described before herein. It is obvious that, if the correct pitch diameter is obtained with the teeth at one end of both racks in mesh and an incorrect pitch diameter obtained with the teeth of the other ends of said racks in mesh, the obvious conclusion is that the teeth have not been accurately centered and the amount of divergency can be readily measured by measuring the distance between the pins 25, 29. The operator can by suitable adjustments in the fixtures on the gear cutting machine, or in the machine itself, readily correct the error which has been discovered in centering of the rack teeth.

When a pair of racks has been obtained which have been found to be correct as regards pitch diameter, the knob 57 may be tightened and the pointer of the gauge 49 adjusted to some arbitrary point on the dial. This result may be readily obtained by adjusting the gauge 49 toward or away from the element 46 or by means of the usual zero setting knob often found on such dial gauges. The next step is to loosen the thumb screw 57 and accurately balance the slide 33 by moving the weight 54 until there is just sufficient weight left unbalanced to cause the racks to mesh with the proper pressure. The gauge has now been set to a standard which is, of course, a pair of correctly cut racks.

It will be obvious that by rotating the members 21, 22 with the racks in mesh while the slide is balanced that the behavior of the teeth in meshing relation may be readily observed by referring to the shadow or silhouette thrown upon the chart constructed on the screen. In this manner inaccuracies in the shape of the teeth may be readily observed and the amount of deviation from the true form accurately measured upon the screen.

After the gauge has been correctly set it may be used to test the correctness of parts as they are turned out from the cutting machine, it being merely necessary to clamp a pair of specimen racks upon the members 21, 22 and rotate them slowly, observing the action of the pointer of gauge 49 and at the same time studying the behavior of the teeth in meshing relation by referring to the screen. If it should happen, for some unexplained reason, that the gear cutting machine begins to cut the teeth inaccurately with too large or too small a pitch diameter or by cutting the teeth too deep or not deep enough at any part of the rack, rotation of the members 21, 22 with the teeth in meshing relation will cause the pins 25, 29 to separate slightly when the teeth have not been cut deep enough or with too large a pitch diameter so that the pointer of the gauge 49 will move from its arbitrarily adjusted position, or in the case of too small a pitch diameter, the pins 25, 29 will move towards each other slightly and the pointer of gauge 49 will be deflected in the opposite direction, the amount of deflection in either direction indicating the amount which the pitch diameter is oversize or undersize or the amount by which the teeth have been cut too deep or not deep enough.

The same procedure applies to the inspection of pinions, the only difference being that the pins 25, 29 and the parts carried thereby will be removed, as explained hereinbefore, and the pins 64 used instead, the pinions 65 to be inspected being pressed upon the pins 64. In the case of very small pinions or gears having very fine teeth, it will be found desirable to cause the meshing relation by tightening the thumb screw 57 slightly so that tapping upon the underside of beam 52 will gradually bring the pinions or gears into mesh.

It is obvious that the gauge illustrated in the drawings provides a very simple and efficient device particularly adapted for use with an optical device of the type mentioned and while at first glance its operation may seem complicated, in the hands of an operator of ordinary skill who is accustomed to using such devices it very quickly gives the desired information, namely whether the teeth have been cut correctly as to size, shape, and pitch diameter. Once it has been set by means of two correctly cut racks or pinions no further adjustments need be made as the gauge 49 will show accurately the amount of deviation in the pitch diameter or the amount by which the teeth have been cut too deep or not deep enough at any part of the rack or gear. By reversing the racks or gears and repeating the inspection as herein described, the parrallelism of the teeth may be very readily determined. It is for this reason that the members 21, 22 have been provided with three pins 38 instead of only two.

The present invention has been shown as embodied in a specific form of apparatus and carried out in a specific manner purely for purposes of illustration and it is not desired to limit the invention to the precise form shown nor to the particular mode of operation described as the invention is capable of variation as to form and details in order to more readily adapt it to the conditions found in practice.

I claim:

1. A fixture for use in connection with a contour measuring optical device comprising a vertically extending frame having a vertical face and adapted to be clamped to the table of the contour measuring machine, two work supporting members rotatably mounted on said vertical face of said frame for movement relative to each other in a vertical plane transverse of the axis of rotation of said members, means carried by each of said members for clamping in meshing relation toothed machine elements to be inspected while mounted in said members, said frame having an opening adjacent the meshing point of said elements adapted to permit a light beam to be projected transversely of said elements and through said opening whereby to project an enlarged image of the meshed teeth upon a suitable screen for the purpose of studying the meshing characteristics of said elements, and an indicating-measuring-device operated by relative movement of the work supporting members for indicating directly variations in the proportions of said teeth while the meshing characteristics of selected teeth are being viewed on the screen.

2. A fixture for use in connection with a contour measuring optical device comprising a vertical frame adapted to be clamped to the table of the optical device, said frame having a vertical face, a fixed support and a vertically slidable support mounted on said face, a carrier rotatably mounted on each of said supports and having means for clamping toothed members on said support in meshing relation, said frame having an opening formed therein adjacent the meshing point of said toothed members and adapted to permit a beam of light to be projected transversely of said members by the optical device whereby to permit visual examination of the meshing characteristics of the teeth in meshing relation upon a screen receiving an enlarged projected outline of the meshed teeth, adjustable counterbalancing means for offsetting part of the weight of the elements carried by the vertically slidable support to produce normal working pressure on the teeth at the meshing point of said members, and an indicating device operated by the slidable support for directly indicating the values of variations in the dimensions of the teeth in meshing relation.

GLEN N. HUTCHINSON.